United States Patent [19]

Williams

[11] Patent Number: 4,843,585
[45] Date of Patent: Jun. 27, 1989

[54] PIPELINEABLE STRUCTURE FOR EFFICIENT MULTIPLICATION AND ACCUMULATION OPERATIONS

[75] Inventor: Tim A. Williams, Austin, Tex.

[73] Assignee: Motorola, Inc., Schaumburg, Ill.

[21] Appl. No.: 96,867

[22] Filed: Sep. 14, 1987

[51] Int. Cl.$^4$ .............................................. G06F 7/52
[52] U.S. Cl. .................................................. 364/759
[58] Field of Search .................... 364/752, 757–760

[56] References Cited

U.S. PATENT DOCUMENTS

| | | | |
|---|---|---|---|
| 4,153,938 | 5/1979 | Ghest et al. | 364/760 |
| 4,168,530 | 9/1979 | Gajski et al. | 364/760 |
| 4,546,446 | 10/1985 | Machida | 364/759 |
| 4,575,812 | 3/1986 | Kloker et al. | 364/760 |
| 4,745,570 | 5/1988 | Diedrich et al. | 364/760 |
| 4,748,582 | 5/1988 | New et al. | 364/754 |

OTHER PUBLICATIONS

Waser et al., "Real-Time Processing Gains Ground With Fast Digital Multiplier", Electronics, Sep. 29, 1977, pp. 93–99.

Waser, "High-Speed Monolithic Multipliers for Real-Time Digital Signal Processing", IEEE (Computer) 1978, pp. 19–29.

IBM, Technical Discl. Bull, vol. 27, No. 11, Apr. 1985, pp. 6624–6632, "Improved Approach to the Use of Booth's Multiplication Algorithm".

Rubinfield, "A Proof of the Modified Booth's Algorithm for Multiplication", IEEE Transactions on Computers, Oct. 1975, pp. 1014–1015.

Hwang, "Computer Arithmetic", John Wiley & Sons, 1979, pp. 179–184.

Baugh et al., "A Two's Complement Parallel Array Multiplication Algorithm", IEEE Trans. on Computer, vol. C-22, No. 12, Dec. 1973, pp. 1045–1047.

Primary Examiner—Gary V. Harkcom
Assistant Examiner—Tan V. Mai
Attorney, Agent, or Firm—Robert L. King

[57] ABSTRACT

A pipelineable multiplier which implements two's complement Modifiied Booths' algorithm multiplication. Partial product bits are formed to create an array having an integer number of rows and columns. An addition of partial product bits of each row is accomplished in pipelined fashion by using an arithmetic machine for each row. Each arithmetic machine is a time multiplexed summer including a plurality of full adders, the number of full adders being proportional to a ratio of the sum and carry bit propagation delays of each of the full adders. In one form, full adders having a carry propagation delay substantially twice as fast as a sum propagation delay are used in the pipelineable structure.

6 Claims, 8 Drawing Sheets

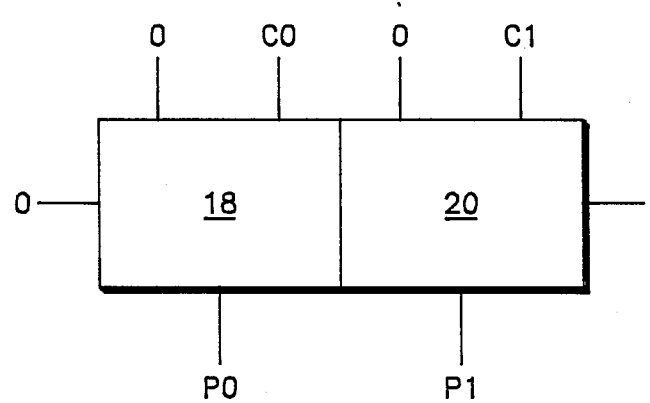
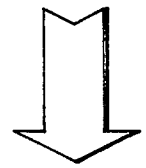
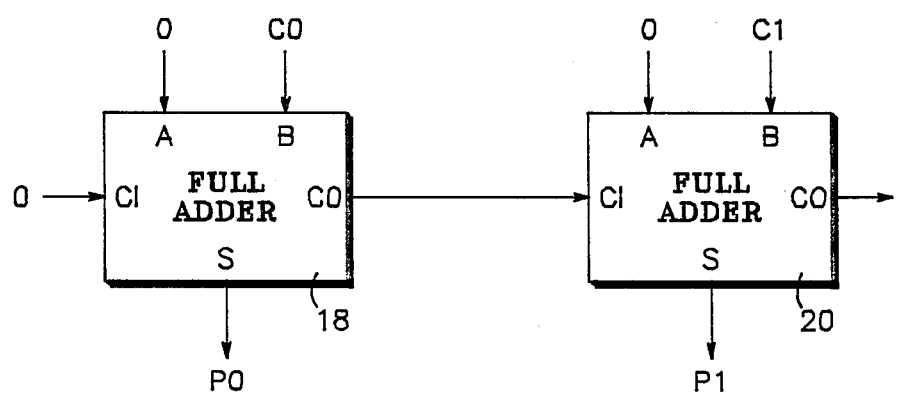
FIG. 4B

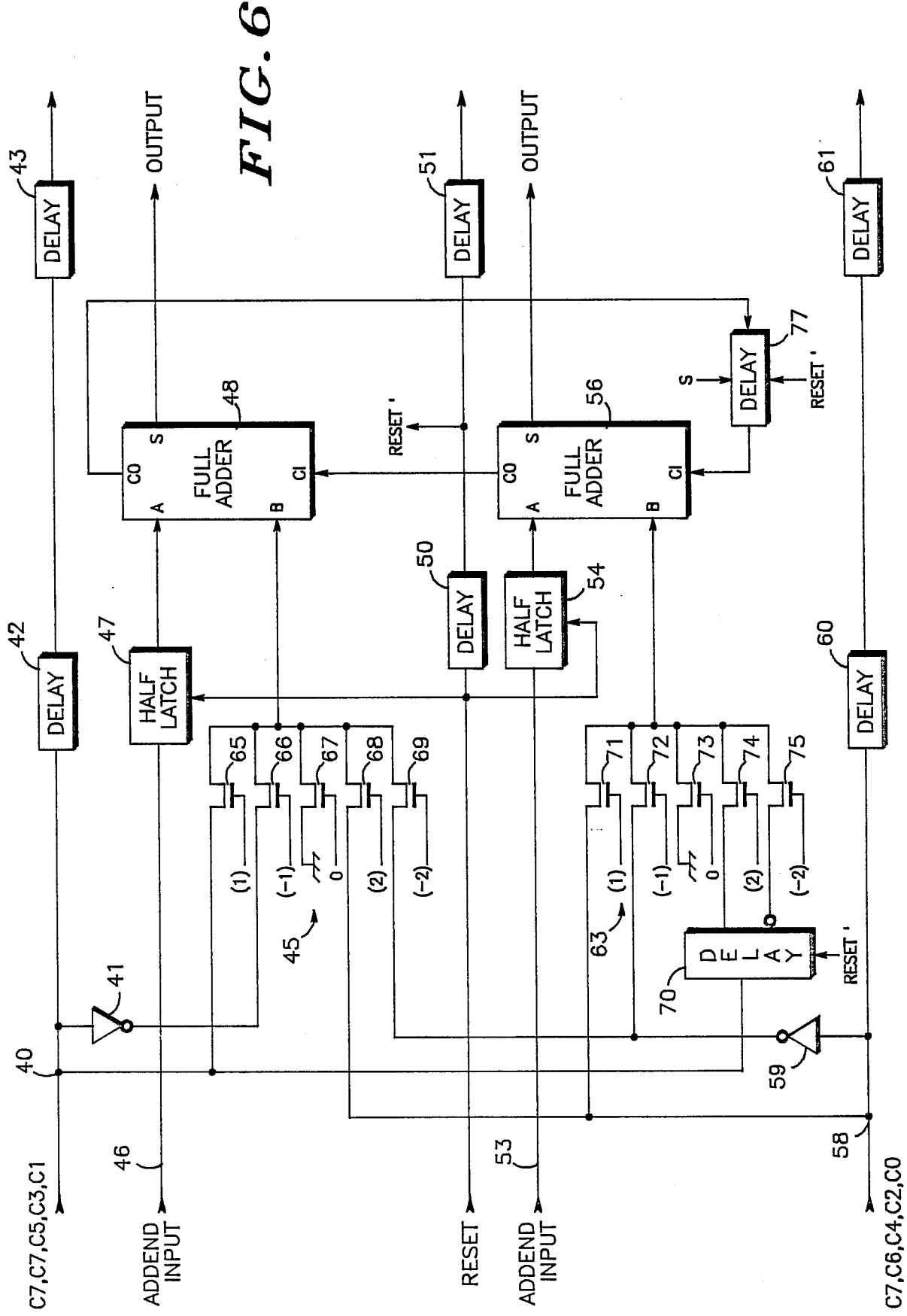

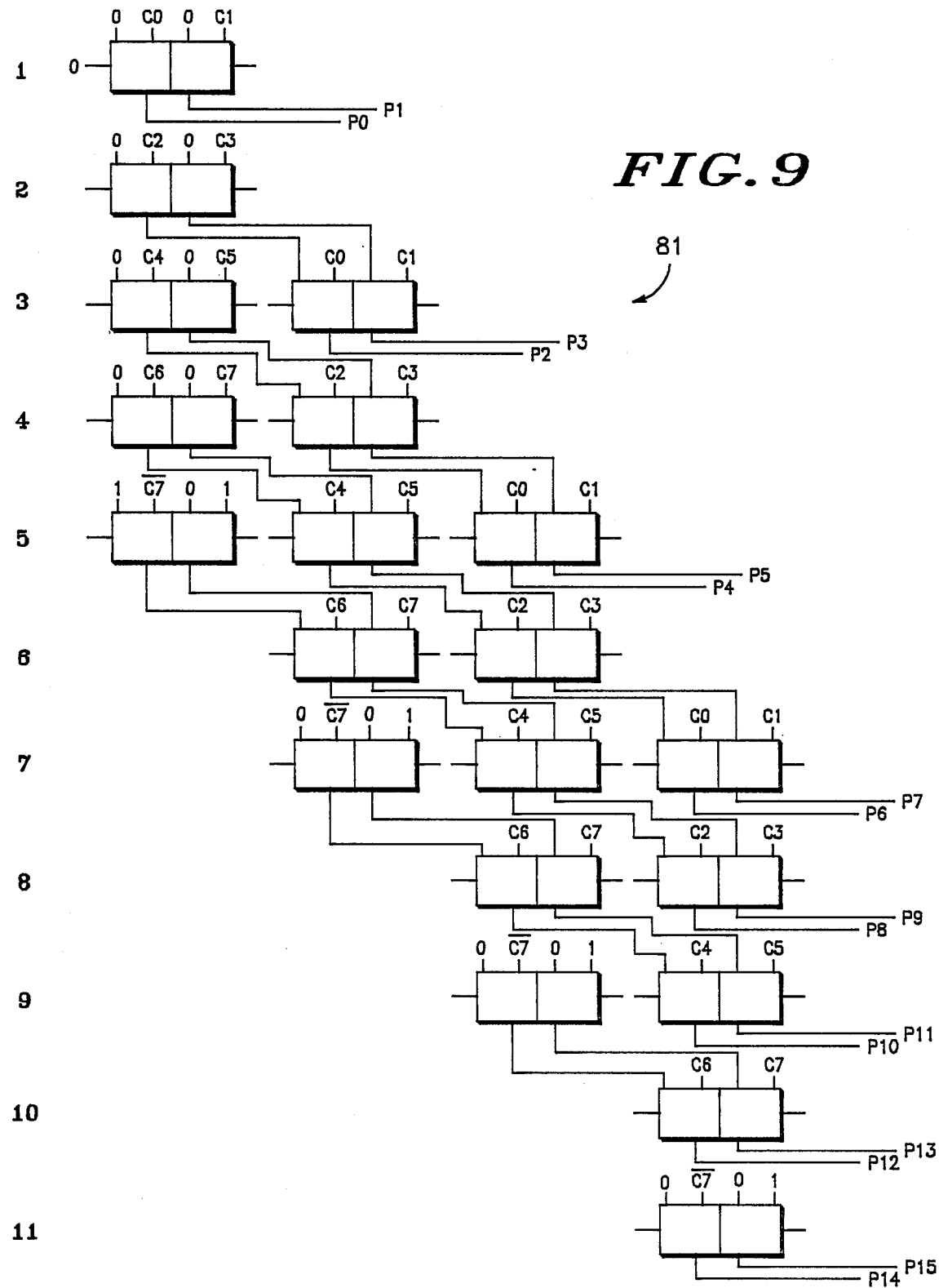

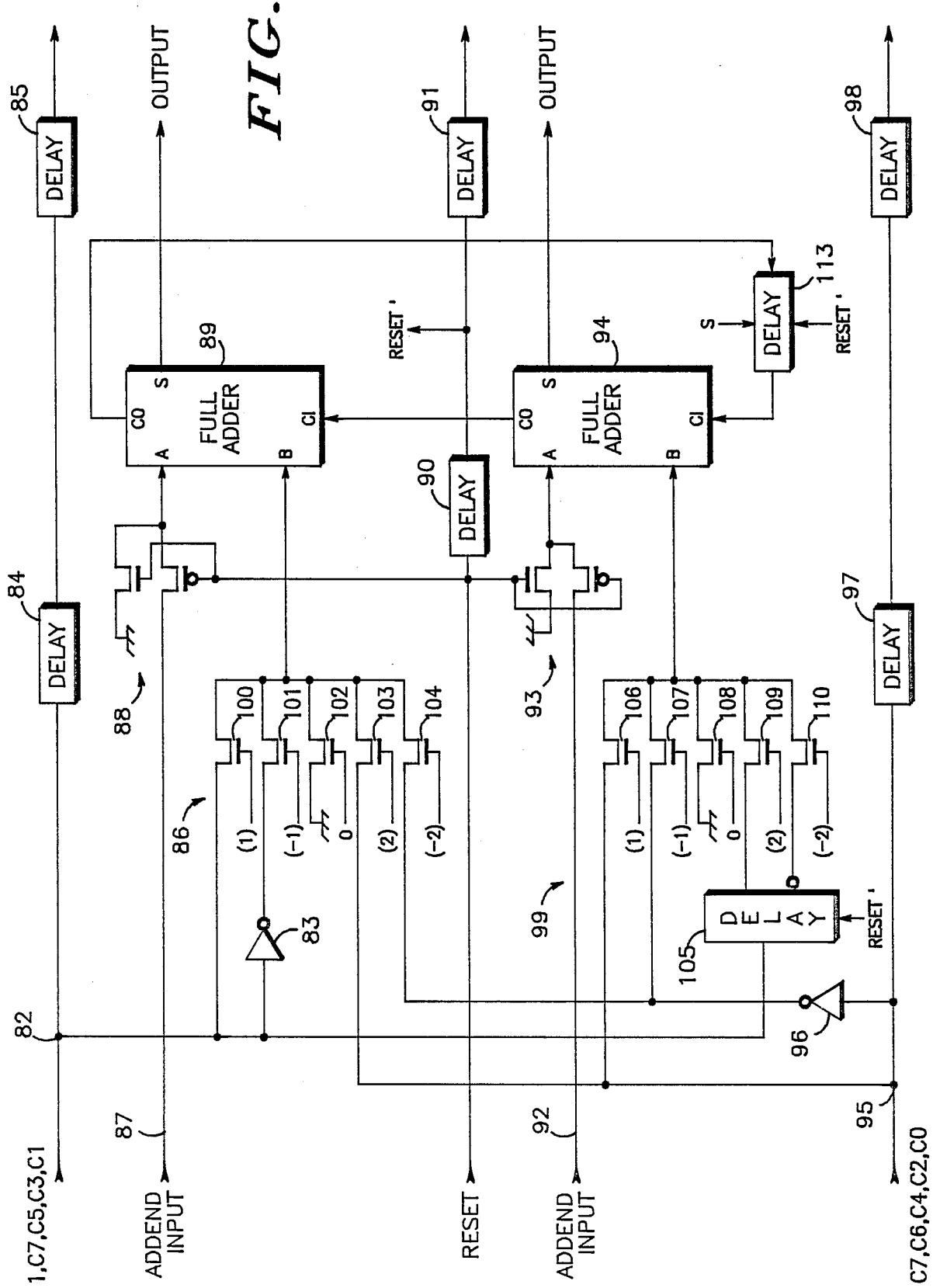

PIPELINEABLE STRUCTURE FOR EFFICIENT MULTIPLICATION AND ACCUMULATION OPERATIONS

TECHNICAL FIELD

This invention relates to arithmetic processing circuitry, and more particularly to, circuits which function to multiply and selectively accumulate data operands.

BACKGROUND ART

Digital multiplier circuits are typically implemented to multiply operands having very large bit sizes. In order to reduce the circuitry required to implement the multiplication operation, a recoding algorithm such as Modified Booth's algorithm is commonly utilized. A plurality of full adder circuits is commonly used to implement the addition of partial product bits to provide an output product. Some multipliers lose speed by having a structure which does not allow multiplication operations to be continuously generated. Such multipliers are structured so that there are periods of time during which no arithmetic operations are being implemented due to delays in providing intermediate operands necessary to continue the multiplication operation. Some multiplier structures are modified and commonly referred to as being "pipelined" in an effort to start a successive multiplication operation during any nonproductive time and before completion of an existing calculation. A typical problem associated with digital multipliers that are pipelined is that the full adders which are used to sum partial product bits cause delays due to propagation delays in the full adder circuits. Such delays in a multiplier are referred to as the "latency" of a multiplier. Even when a multiplier structure is pipelined, the latency of a multiplier may be significant for a multiplication of operands with many bits.

BRIEF DESCRIPTION OF THE INVENTION

Accordingly, an object of the present invention is to provide an improved pipelineable structure for efficient multiplication with selective accumulation.

Another object of the present invention is to provide an improved circuit for multiplying data operands.

Yet another object of this invention is to provide an improved method of providing a system for multiplication and accumulation of data operands.

A further object of the present invention is to provide an improved method for minimizing circuit area and improving speed in a multiplier structure.

Yet a further object of the present invention is to provide an improved multiplier architecture for implementing modified Booth's algorithm.

In carrying out the above and other objects of the present invention, there is provided, in one form, a pipelineable array multiplier for multiplying first and second input operands and providing an output product. The array multiplier utilizes a predetermined recoding algorithm to implement a multiplication operation with X rows and Y columns of partial product bits. When the X rows and Y columns of partial product bits are summed, the output product is generated. The values X and Y are integer values. The array multiplier comprises X summing portions for adding the partial product bits of the array to form the output product. Each of the X summing portions adds the partial product bits of a predetermined one of the X rows in successive time periods. Each summing portion comprises a predetermined number of adder circuits. The predetermined number of adder circuits is proportional to a ratio of carry and sum bit propagation delays of the adder circuits which exist when forming output sum and carry bits. A control portion is coupled to the X summing portions for controlling the successive additions of each of the X summing portions.

These and other objects, features and advantages will be more clearly understood from the following detailed description taken in conjunction with the accompanying drawings.

BRIEF DESCRIPTION OF THE DRAWINGS

FIG. 4B illustrates in block diagram form a detailed portion of the pipelined multiplier of FIG. 4A;

FIG. 6 illustrates in partial schematic form a detailed implementation of a portion of the multiplier of FIG. 5;

FIG. 9 illustrates in block diagram form a pipelined multiplier in accordance with the array of FIG. 8; and FIG. 10 illustrates in partial schematic form a detailed implementation of a portion of the multiplier of FIG. 9.

DETAILED DESCRIPTION OF THE INVENTION

Figure 1:
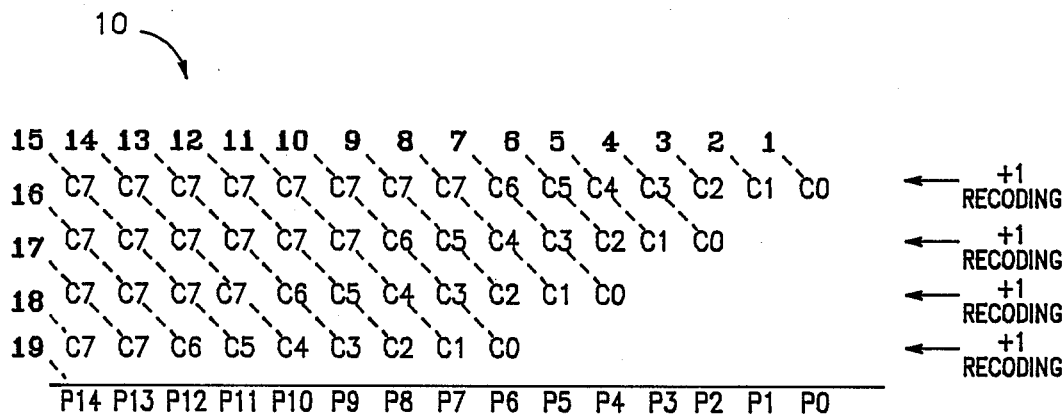
FIG. 1 illustrates in array diagram form a cyclic formation of product bits from sequential addition of partial product bits in a recoded digital multiplier.

Shown in FIG. 1 is a multiplication array 10 of partial product bits which illustrates the sequential addition of partial product bits to form an output product in two's complement Modified Booth's algorithm multiplication. For purposes of illustration only, signed input multiplier and multiplicand operands of eight bits each have been assumed. It should be well understood that the multiplier principles taught herein apply equally for any combination of operand sizes. Since two signed eight-bit operands are multiplied, a product having fourteen magnitude bits, P0 thru P13, and a sign bit P14 are formed. For purposes of illustration only, the partial product bits in array 10 are designated by the letter "C" and are weighted bits of an input multiplicand C operand. Each row of partial product operands in array 10 is recoded in accordance with Modified Booth's algorithm for purposes of illustration only. Other recoding algorithms may be used for purposes of the present invention. Implementation of a recoding algorithm reduces the number of rows of partial products which are generated. For purposes of illustration only, a recoding factor of +1 for each row of partial product operands is illustrated. Additional recoding factors of 0, −1 or ±2 may be used for each row to implement Modified Booth's algorithm in array 10.

Previously, others have implemented the required addition of columns of partial product bits of array 10 by dedicating a full adder circuit for each partial product bit location. In other words, the first row of operands is implemented by a row of fifteen full adder circuits. Additions of partial product bits in each row are implemented in sequential fashion from right to left. For example, fifteen additions occur in the first row before additions in the second row of operands are made. As a result of propagation delays associated with each adder circuit, the total amount of time to sum all the columns of array is very long. Fifteen time delays per row of partial product bits is required since each row has fifteen propagation delays associated with fifteen adder circuits.

The present invention provides a much faster technique to implement array 10. Instead of utilizing a plurality of adder circuits per array row, the present invention utilizes only one full adder circuit per row of partial product bits in a time multiplexed fashion. Additions in each row of bits are again performed serially. However, only one adder circuit is physically required to be implemented per row. The dashed lines drawn in array 10 illustrate time delays associated with the formation of product bits as the columns of partial product bits are added from the farthest right or least significant ranked column to the left. Assume that all partial product bits are available for addition at the same time. Addition of the partial product bits in array 10 may be implemented by full adder circuits. Initially assume that the full adder circuits which are used have a carry propagation time which is equal to the sum propagation time. The first time period is dedicated to the least significant partial product bit, C0, of the first row, which may be immediately outputted as output product bit P0. The second time period indicates that the addition of partial product bit C1 must wait until a carry bit, if any, from the C0 term is provided. Not until the fourth time period are full adders from two rows actually functioning simultaneously. In the fourth time period, bit C3 of the first row is added with any carry input bit which is generated in the first row from previous time periods. Simultaneously, bit C0 of the second row is added with a sum input from the first row to form output product bit P2. Additions of partial product bits continue in an analogous manner thru array 10 to form the output product operand P. As illustrated, a total of nineteen delays or time periods is required before fourteen magnitude bits and a sign bit are generated. For example, in time period twelve, bit C2 of the fourth row is added to the previous sum bit calculation associated with the respective column containing bit C2 to generate output product bit P8. Simultaneously, output product bit P7 has been formed and is outputted. During the eighteenth time period, the sign bit of the formed product is formed by adding in the last carry input bit from the addition which occurred in the fourth row during the seventeenth time period. At the beginning of the nineteenth time period, the sign bit P14 is available.

As illustrated in FIG. 1, column additions in array 10 are performed serially. Therefore, a carry bit may propagate along a row by simply being held in the same adder circuit until the successive time period. The most significant disadvantage of array 10 is fact that a large number of time periods are still required to provide an output product. Further, array 10 is also not efficient to implement because sum and carry propagation delays which exist in most adders are not typically equal as was assumed in the product formation. Therefore, the nineteen time periods of array 10 are not efficiently utilized.

Figure 2:
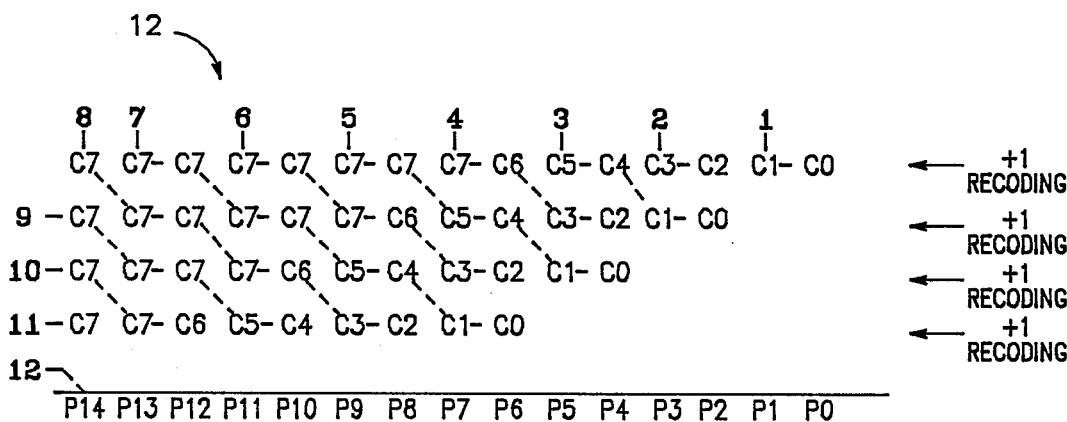
FIG. 2 illustrates in array diagram form a cyclic formation of product bits from sequential addition of partial product bits in a recoded digital multiplier implemented with full adders of predetermined bit propagation characteristics.

Shown in FIG. 2 is an array 12 which performs the same function as array 10 but which functions in a much faster and efficient manner. For purposes of illustration, the same partial product notation and recoding scheme is utilized. However, the number of time periods required to implement the same arithmetic function has been reduced from nineteen to eleven. Array 12 is again implemented with four time multiplexed full adders, one per row. However, each of the full adders is implemented by circuitry wherein, for purpose of example only, the carry bit propagation is twice as fast as the sum bit propagation. Adders having unbalanced propagation delay paths are commonly found in MOS and other semiconductor technologies and have previously caused slower multipliers. Time delays or periods are once again illustrated in FIG. 2 by dashed lines. Since four rows of partial product bits exist, four groups of adders are used wherein one adder group is dedicated to each row. However, instead of using a single adder per row, a pair of adders per row is utilized in array 12 since the carry propagation of each adder is twice the sum propagation. If other propagation delay ratios exist, adder groups other than two should be used. In the first time period, both the addition of bit C0 in the least significant column and the addition of bit C1 and a carry input bit in the next to least significant column occur to form output product bits P0 and P1. The addition of other partial product bits and carry bits which are generated occurs in an analogous manner thru array 12.

Figure 3:
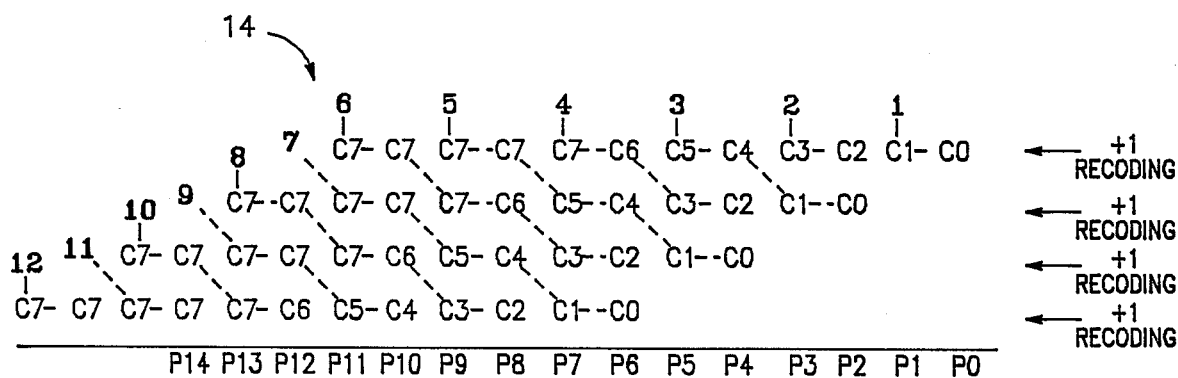
FIG. 3 illustrates in array diagram form a cylcic formation of product bits from addition of partial product bits in a pipelined recoded digital multiplier.

Shown in FIG. 3 is an array 14 which is similar to array 12 in product bit formation with the exception that array 14 is a pipelineable architecture. The primary difference between array 14 and array 12 is that sign extension in the first three rows of recoded product bits of array 14 is implemented by carrying the sign calculation in each row only far enough to the left that the next summation is not affected, but the carry bits are still required to be in the column summation. In this pipelineable array, the number of time periods required to multiply an X bit input operand and a Y bit input operand is $[4+(X/2)]+(Y/2)$ time periods, where X and Y are integers and Modified Booth's algorithm is the recoding algorithm which is used. Therefore, when two eight-bit operands are multiplied, twelve time periods are required. The advantage of array 14 over array 12 is the fact that array 14 is pipelineable and a plurality of multiplication operations may be implemented in time overlapped fashion. In other words, after the sixth time period, the plurality of time multiplexed adders dedicated to the first row may be used to begin another multiplication operation in parallel during time period seven and before the end of multiplications may be implemented in an efficient time overlapped operation. The number of time periods required between subsequent multiplications of an X bit operand with another operand is $[(X/2)+3]$ time periods, where X is an integer.

Figure 4A:
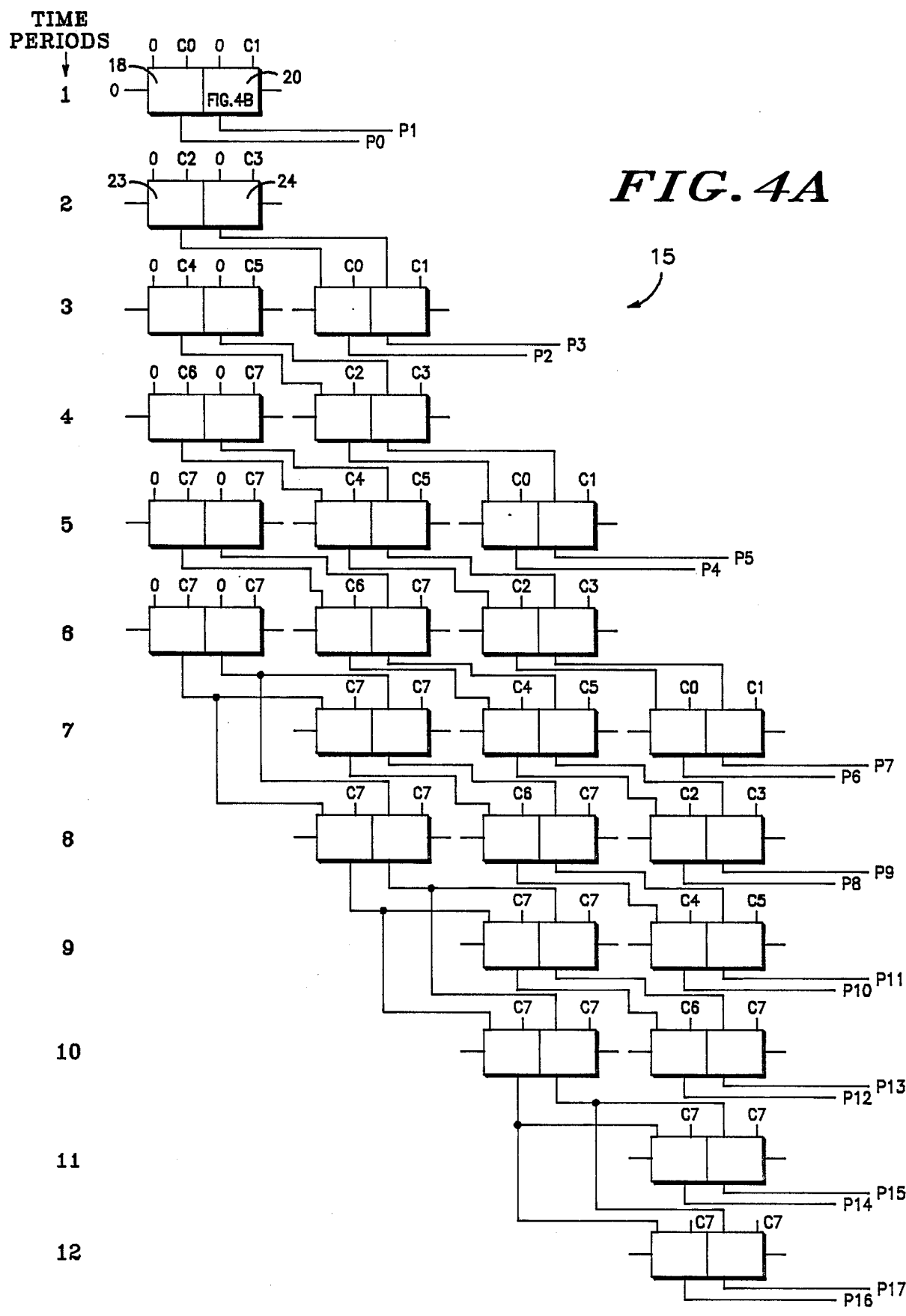
FIG. 4A illustrates in block diagram form an implementation of a pipelined multiplier in accordance with the array of FIG. 3.

Shown in FIG. 4A is a multiplier 15 for implementing array 14 of FIG. 3. Multiplier 15 comprises four distinct machines in which each comprises a column of a time multiplexed plurality of full adder circuits. Each machine or column represents calculations associated with a predetermined row of partial product operands. The four machines complete the addition of the partial product bits with the recoded input. Multiplier 15 is further illustrated by a vertical time axis in accordance with the time periods illustrated in FIG. 3. For purposes of better understanding the structure of multiplier 15 as illustrated in FIG. 4A, shown in FIG. 4B is a detailed illustration of a pair of full adders 18 and 20 of FIG. 4A. Full adders 18 and 20 indicate the functional addition implemented by any one of the pairs of full adders illustrated in FIG. 4A. Each adder of a full adder pair has two sum input terminals labeled "A" and "B", a carry input terminal labeled "CI" and a carry output terminal labeled "CO". The carry output terminal of full adder 18 is connected to the carry input terminal of full adder 20. Although each rectangle functionally represents a full adder circuit, it should be remembered that each machine is actually physically implemented by a single pair of full adder circuits which are time multiplexed thru the time periods to implement the addition functions of each adder pair. For example, full adders 18 and 20 are the least significant adders of the first machine and function during the first time period. Full adders 23 and 24 of the first machine are the next higher ranked adders, and are implemented during the second time period by the same full adder circuits which performed the functional addition of full adders 18 and 20. The sum and carry inputs for full adders 18 and 20 are all zero with the exception of partial product bit C0 being coupled to adder 20 Adders 18 and 20 provide output product bits P0 and P1 in the first time period. An output carry bit of adder 20 is also produced. Although not shown in FIG. 4A in order to minimize the complicity of detail, the output carry bit of adder 20 is connected to the carry input of adder 23 as an input to adder 23 in a carry save configuration. Further, the carry output bits of all of the right sided adders of all adder pairs are connected to the carry input terminal of the left sided adder of the adder pair immediately below and in the same machine column. All of these connections are implied in the discussion below but not shown in FIG. 4A to avoid unduly complicating the illustration of multiplier 15. After the sum bits of adders 23 and 24 are calculated, the sum bits are connected to sum input terminals of the least significant pair of adders in the second machine or second column of adder pairs. The least significant pair of adders in the second machine provides output product bits P2 and P3 during the third time period of calcuation. Calculation of the output bits continues from the top of multipler 16 toward the bottom until the last magnitude bit P13 is generated. Sign bit P14 is generated in addition to sign extended bits P15, P16 and P17 which are generated only because each of the machines is intended to synchronously operate thru six time periods. To interrupt the fourth machine during the sixth time period is an unnecessary interruption because the first three machines are simultaneously forming the next successive output product and no performance is lost.

In the illustrated form of FIG. 4A, each machine is understood to be recoded by a recoder (not shown) in accordance with an algorithm such as Booth's algorithm or Modified Booth's algorithm. For purposes of illustration only, each machine of array 14 in FIG. 4A is understood to be recoded in accordance with Modified Booth's algorithm by a recoding factor of positive one. Recoding factors for each machine of multiplier 15 may vary by varying the inputs coupled to the adder pairs rather than varying the structure of the machines. A single recoder is capable of driving one machine for a complete product calculation and each machine may be recoded by any factor. It should be well understood that each machine may have the inputs thereto arranged so that a recoding by a factor of 0, $\pm 1$ or $\pm 2$ may be implemented. In each machine, one of the sum inputs of the left adder of the fifth pair of adders is connected to one of the sum inputs of the left adder of the sixth pair of adders. This connection is made for sign extension during the product bit formation as illustrated in array 14 of FIG. 3.

Figure 5:
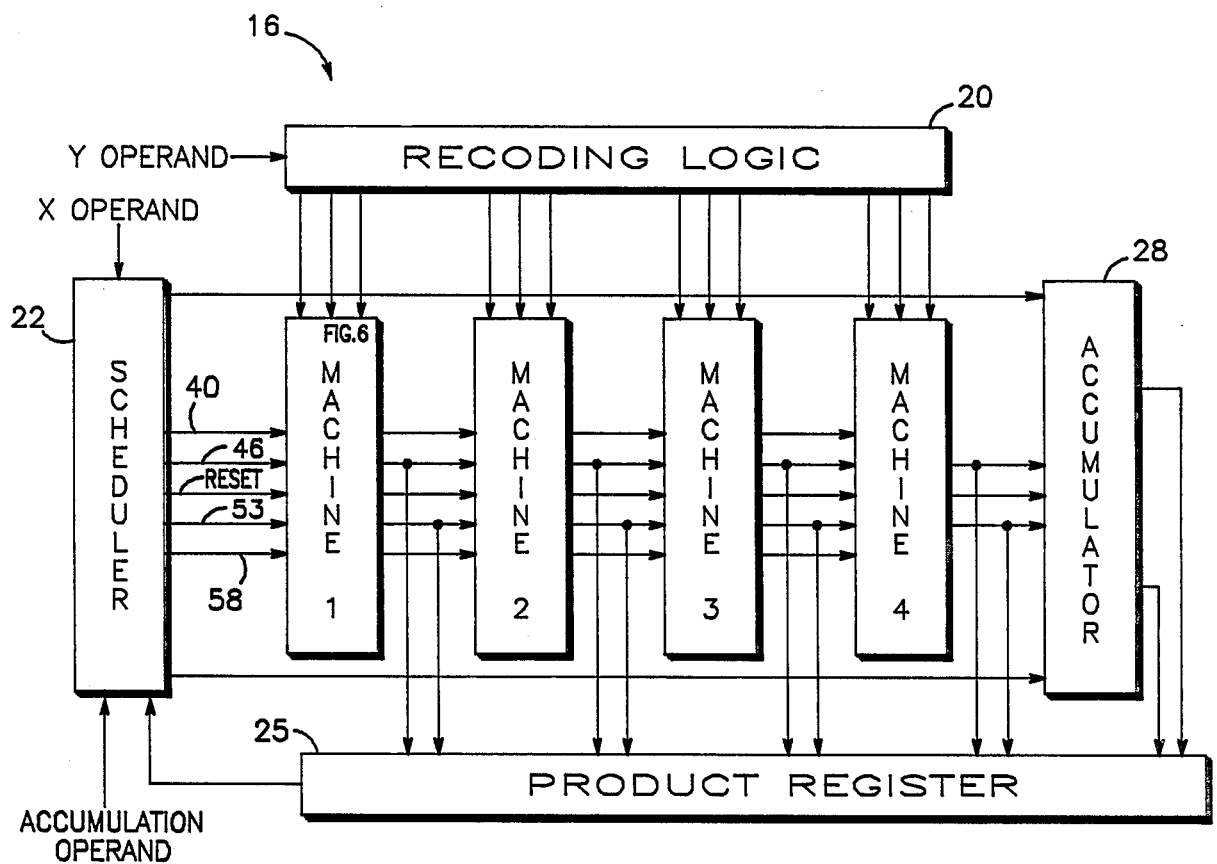
FIG. 5 illustrates in block diagram form the pipelined multiplier of FIG. 3 with an accumulation function.

Shown in FIG. 5 is a block diagram illustration of multiplier 16 which further illustrates the repetitive, uniform nature of the present invention. However, instead of accomplishing strictly a multiplication function, the block diagram of FIG. 5 adds a selective accumulation function to the multiplication operation. In addition to multiplying a first input operand labeled "Y" by a second input operand labeled "X", multiplier 16 is also capable of accumulating the resulting product with a third operand having a bit size in the particular illustrated form of ten bits or less. For larger bit size accumulation operands, an additional machine or column of time multiplexed full adders must be added to multiplier 16 of FIG. 4A. Recoding logic circuit 20 has an input for receiving the Y input operand. A scheduler circuit 22 has a first input for receiving the X input operand. Scheduler 22 has a second input for receiving an accumulation operand to be added to the product of the X and Y operands. Scheduler 22 has two X operand data outputs respectively coupled to two data inputs of machine one and two accumulation outputs coupled to two accumulation inputs of machine one. Recoding logic circuit 20 has a first set of three data outputs coupled to three additional data inputs of machine one. Two data outputs of machine one are coupled to two data inputs of machine two. The two data outputs of machine one are output product bit paths and are coupled to a product register 25 for possible storage or reformatting. A second set of three data outputs of recoding logic circuit 20 is coupled to three additional data inputs of machine 2. Two data outputs of machine two and two accumulation input bits are coupled to two data inputs of machine three. The two data outputs of machine two are output product bit paths and are coupled to product register 25 for possible storage or reformatting. A third set of three data outputs of recoding logic circuit 20 is coupled to three additional data inputs of machine three. Two data outputs and two accumulation outputs of machine three are respectively coupled to two data inputs and two accumulation inputs of machine four. The two data outputs of machine three are output product bit paths and are coupled to product register 25 for possible storage or reformatting. A fourth set of three additional data outputs of recoding logic circuit 20 is coupled to three additional data inputs of machine 4. Two data outputs of machine four are respectively coupled to two data inputs of an accumulator circuit 28 and to product register 24 for possible storage or reformatting. Additional data outputs of scheduler 22 are respectively coupled to additional data inputs of accumulator circuit 28. Accumulator circuit 28 has two data outputs coupled to product register 25 for possible storage or reformatting. Product register 25 has a control output coupled to a control input of scheduler 22.

In operation, multiplier 16 of FIG. 5 is capable of implementing the functions described in connection with FIG. 4A in addition to selective accumulation of the output product with a third operand. Machines one thru four of FIG. 5 correspond to machines one thru four of FIG. 4A which comprise the columns of time multiplexed full adder circuit pairs. Recoding logic 20 implements a predetermined recoding factor of either 0, plus or minus one, or plus or minus two for each machine as discussed previously. Scheduler 22 functions to couple the appropriate sum bits illustrated in FIG. 4A to machine one. The X operand bits are sequentially coupled thru machines one, two and three before being coupled to machine four. In this way, additional data paths from scheduler 22 to each machine is avoided. The output product is coupled to product register 25 for storage and may be outputted either serially or in parallel.

Shown in FIG. 6 is a detailed implementation of any one of machines one, two, three or four of FIG. 5. Each machine has two data addend inputs, two partial product bit inputs and also a reset input. The two data addend inputs receive bits representing previous addition outputs. The partial product inputs receive only C operand data bits from scheduler 22. A first partial product input terminal 40 sequentially receives bits C1, C3, C5, C7 and C7. An input of an inverter 41 and an input of a delay circuit 42 are coupled to input terminal 40. An output of inverter 41 is connected to a recoding portion 45. An output of delay circuit 42 is coupled to an input of a delay circuit 43. An output of delay circuit 43 forms a first of four outputs for machines 1 thru 3. The first output of machine four provides partial product bits for subsequent use in the time multiplexing operation.

As shown in FIG. 6, a second data input terminal 46 receives an addend input from scheduler 22 and is connected to an input of a half latch 47. An output of a half latch 47 is connected to a first sum input terminal of a full adder 48 labeled "A". A sum output labeled "S" of full adder 48 provides a first sum output of the illustrated machine. A reset terminal which receives a reset signal is connected to both an input of a delay circuit 50 and to a control input of half latch 47. An output of delay circuit 50 provides a delayed reset signal (Reset') to be used by the machine as described below and is coupled to an input of a delay circuit 51. An output of delay circuit 51 provides a further delayed reset signal to be used by a sequential machine. An addend input terminal 53 receives a second addend input and is connected to an input of a half latch circuit 54. A control input of half latch circuit 54 is connected to the reset signal. An output of half latch circuit 54 is connected to a first sum bit input terminal labeled "A" of a full adder circuit 56. A sum output labeled "S" of full adder 56 provides a second sum output of the illustrated machine. A fourth input terminal 58 sequentially receives partial product bits C0, C2, C4, C6 and C7. An input of an inverter 59 and an input of a delay circuit 60 are connected to input terminal 58. An output of delay circuit 60 is connected to an input of a delay circuit 61. An output of delay circuit 61 provides a fourth output of the illustrated machine for providing partial product bits for subsequent time multiplexed use. A recoding portion 63 is connected to the output of inverter 59. Recoder portion 45 comprises transistors 65, 66, 67, 68 and 69. Transistor 65 has a first current electrode connected to input terminal 40 and a second current electrode connected to a second data input terminal of full adder 48 labeled "B". Transistor 66 has a first current electrode connected to the output of inverter 41, and a second current electrode connected to the second data input terminal of full adder 48. Transistor 67 has a first current electrode connected to a reference ground terminal, and has a second current electrode connected to the second data input terminal of full adder 48. Transistor 69 has a first current electrode connected to an output of inverter 59, and has a second current electrode connected to the second data input terminal of full adder 48. Transistors 65-69 respectively have a control electrode connected to a control signal for implementing a recoding factor of plus one, negative one, zero, plus two and negative two, respectively. A delay circuit 70 has an input connected to input terminal 40, and has an output and a complementary output. Delay circuit 70 also has a reset terminal labeled "R" for receiving the reset signal from the output of delay circuit 50. Recoder portion 63 comprises transistors 71, 72, 73, 74 and 75. Transistor 71 has a first current electrode connected to input terminal 58, and has a second current electrode connected to a second data input terminal of full adder 56 labeled "B". Transistor 72 has a first current electrode connected to the output of inverter 59, and has a second current electrode connected to the second data input terminal of full adder 56. Transistor 73 has a first current electrode connected to a reference ground terminal, and has a second current electrode connected to the second data input terminal of full adder 56. Transistor 74 has a first current electrode connected to an output of delay circuit 70, and has a second current electrode connected to the second data input terminal of full adder 56. Transistor 75 has a first current electrode connected to the complementary output of delay circuit 70, and has a second current electrode connected to the second data input terminal of full adder 56. Transistors 71-75 respectively have a control electrode connected to a control signal for implementing a recoding factor of plus one, negative one, zero, plus two and negative two, respectively. A carry output terminal of full adder 48 is connected to an input of a delay circuit 77. An output of delay circuit 77 is connected to a carry input terminal of full adder 56. Delay circuit 77 has a reset terminal labeled "R" for receiving the reset signal from the output of delay circuit 50, and has a subtraction control signal input terminal labeled "S" for selectively coupling a carry input bit to adder 56 to implement two's complement addition.

In operation, delay circuits 42, 43 and delay circuits 60, 61 provide the delay associated with the time periods illustrated in FIG. 4A in which the first adder pair of each machine successively receives the bit C0 or C1. The amount of delay between two successive machines for receiving the C operand bits is two time periods which is implemented by either delay circuits 42, 43 or delay circuits 60, 61. Input terminals 46 and 53 receive the sum outputs of the pair of full adders of the time period immediately preceding the presently executing time period. As a result, full adders 48 and 56 may be used repetitiously in time multiplexed fashion to implement each of the full adder pairs in any one of the machines in FIG. 4A without having to implement a full adder pair for each discrete pair illustrated in FIG. 4A. To implement the time multiplexing, the sum outputs of full adders 48 and 56 may be routed back to the input terminals 46 and 53, respectively. Half latch circuits 47 and 54 are normally conductive and not latching except during the last time period of the machine's calculation when the latch circuits hold the previous addend inputs for sign extension purposes. The reset line which divides the machine in FIG. 6 provides the only timing information which propagates through multiplier 16. The reset signal is a normally low logic level signal which transitions to a high logic level during the last time period of a calculation. After a delay of one time period, which is provided by delay circuit 50, the reset signal is formed for the machine. Delay circuit 51 provides an additional delay of one time period before the reset signal is propagated to the next successive machine. Adder circuits 48 and 56 are add circuits only. Subtraction may be implemented by using delay circuits 70 and 77 to implement two's complement addition in full adder 56. Full adder circuit 56 is the least significant adder of the adder pair and receives a carry input bit from full adder circuit 48 via delay circuit 77. A carry output of full adder circuit 56 is coupled to a carry input of full adder circuit 48 as was mentioned but not shown in detail in FIG. 4A. The reset input to delay circuit 77 clears out the carry input chain at the beginning of a new multiplication operation.

Figure 7:
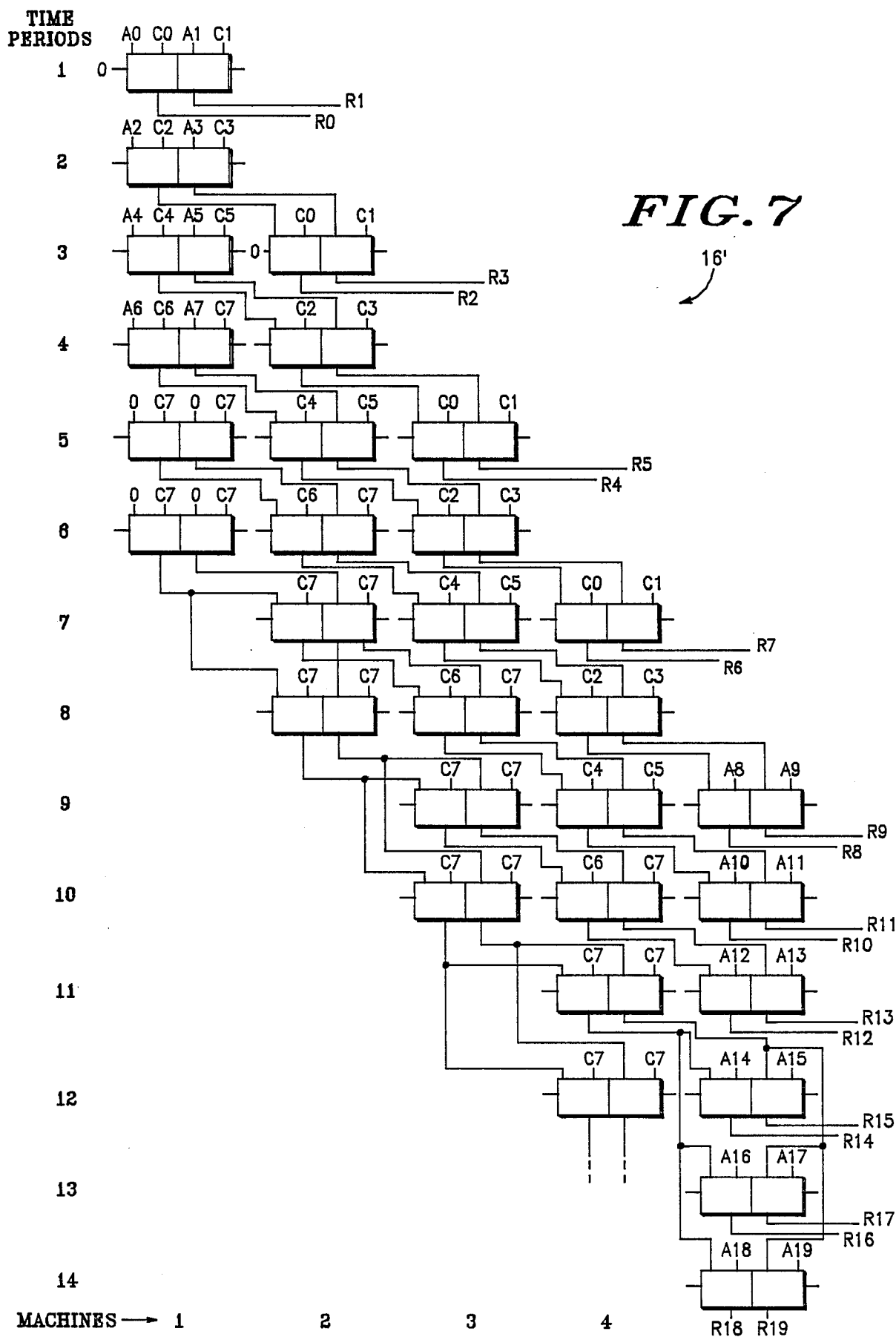
FIG. 7 illustrates in block diagram form an implementation of a pipelined multiplier/accumulator.

Shown in FIG. 7 is a multiplier/accumulator 16' which is a modified version of multiplier 16 of FIG. 4A. Multiplier/accumulator 16' implements the accumulation function illustrated in FIG. 5 by accumulator circuit 28. In the illustrated form, time periods are again illustrated on a vertical axis and machines are illustrated on a horizontal axis. The mutliplier/accumulator retains a pipelineable architecture and is very similar to multiplier 16 of FIG. 4 with the exception that an additional accumulation machine is added. Accumulation bits are coupled into the sum input terminals of the adder pairs in the first machine where logic zeros had previously been fixed. Therefore, additional circuitry is minimized. Accumulator 28 is a machine which is very similar to the machine of FIG. 6. In particular, accumulator 28 comprises a plurality of full adder circuit pairs which are coupled in the same manner as the previous machines with the exception that there is no recoding circuitry coupled to the "A" or sum input of each full adder circuit. Instead, accumulation operand input bits are inputted directly to the full adder circuits. All of the output resultant bits R0 thru R19 are outputted before another multiply/accumulate cycle occurs.

Figure 8:
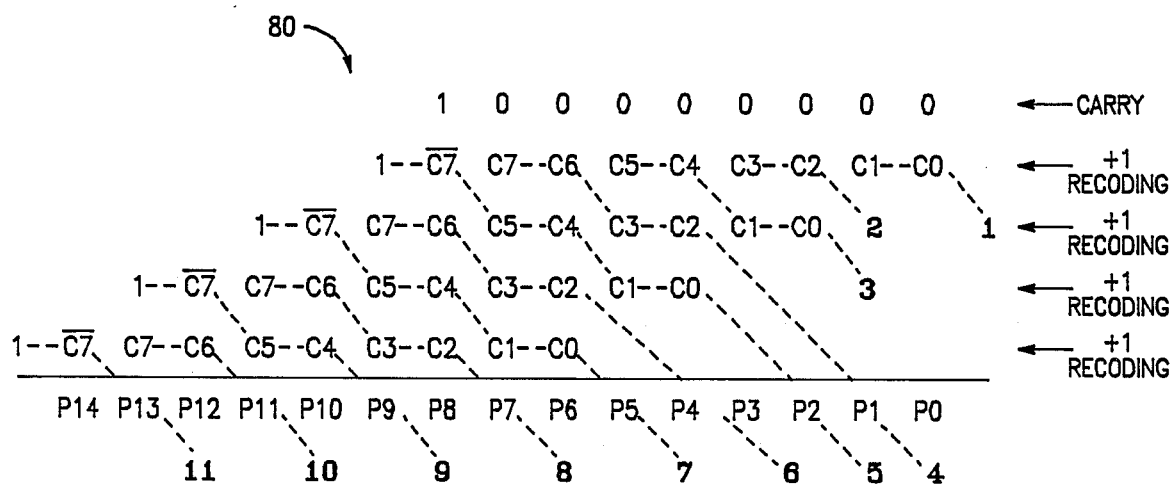
FIG. 8 illustrates in array diagram form a cyclic formation of product bits from sequential addition of partial product bits in accordance with a carry extension simplification technique.

Shown in FIG. 8 is a pipelineable array 80 which represents yet a further enhancement over the pipelineable array of FIG. 3. Array 80 utilizes a modified version of a two's complement multiplier known as the "Baugh-Wooley Two's Complement Multiplier" as originally described in "A Two's Complement Parallel Array Multiplication Algorithm" by C. V. Baugh and B. A. Wooley in the IEEE *Transactions on Computers*, Vol. C-22, No. 12, December, 1973, pages 1045–1047. Baugh-Wooley's multiplier utlizes an algorithm which functions to create all positive summands in a conventional shift and add array so that the array may be quickly added with the same type of full adders and with no additional full adders dedicated to sign determination. Negative summands are not subtracted. Rather, negative summands are computed by addition by using the two's complement of the negative summands. The Baugh-Wooley technique has been subsequently published in numerous treatises such as in *Computer Arithmetic* by Kai Hwang (John Wiley & Sons, 1979, pages 179–184).

In the illustrated form, array 80 illustrates a recoded array of the multiplication of two eight-bit operands. The dashed lines of FIG. 8 again illustrate the number of time periods or cycles required to generate all output product bits. Again, the assumption is made that the carry propagation delay of each full adder in array 80 is twice as fast as the sum propagation delay. The first row of bits in array 80 represents the addition of one to the sign extension portion of array 80. In addition to adding in a one in the ninth column, the sign extended bits of each row are complemented. It should be noted that as in FIGS. 2 and 3, the labeling of the time periods is not intended to completely correlate with the timing of the output product bit generation. Of particular interest in array 80 is the fact that each row of partial product bits may be added in only five time periods as opposed to six time periods in FIG. 3. As a result, array 80 may be implemented with machines of full adder pairs that are only occupied for five cycles rather than six cycles per multiplication. Such a feature is a noticeable performance gain over array 14 of FIG. 3. In addition, the entire generation of an output product operand only takes eleven time periods or cycles for array 80 as opposed to twelve cycles for array 14 of FIG. 3.

Shown in FIG. 9 is a multiplier 81 which is a detailed implementation of array 80 of FIG. 8. In the illustrated form, multiplier 81 is illustrated by time periods along a vertical axis and by machines along a horizontal axis and is pipelineable. Each machine comprises only one pair of full adder circuits time multiplexed five times in successive time periods. As was illustrated in FIGS. 4A and 7, each full adder represented in block diagram form has a carry input terminal labeled "CI", two sum input terminals, a sum output terminal, and a carry output terminal. The left-handed full adder of each adder pair has a carry output terminal connected to a carry input terminal of an adjacent right-handed full adder (not shown). The right-handed full adder of the full adder pair has a carry output terminal which is connected to a carry input terminal of a left-handed time multiplexed full adder immediately below during a successive time period. The last time multiplexed full adder pair has a carry output bit which is reset at the end of the machine's computation and before another calculation is begun. The output product bits are generated during the time periods illustrated in FIG. 9. Since only five time periods are required for each machine to generate each machine's contribution to the output product, increased efficiency is realized when a plurality of multipliers are pipelined. Another advantage provided in the Baugh-Wooley technique is the fact that sign extension of the partial product does not require special circuitry. The logic one which is added into array 80 is implemented in multiplier 81 in the first machine during the fifth time period and with the left-handed full adder circuit. Other locations exist for adding the logic one into multiplier 81, and it should be noted that the addition of the logic one as shown is by way of example only. When a nonzero recoding factor is implemented in each machine, all of the machines have the same second addend input in the last time period of each machine. This uniformity further simplifies implementation of multiplier 81.

Shown in FIG. 10 is a detailed implementation of any one of machines 1, 2, 3 or 4 of FIG. 9. Each machine has four data inputs and also a reset input which is not shown in FIG. 9. Two of the data inputs receive only C operand data bits. A first data input terminal 82 sequentially receives bits C1, C3, C5, C7 and 1. An input of an inverter 83 and an input of a delay circuit 84 are coupled to input terminal 82. An output of delay circuit 84 is coupled to an input of a delay circuit 85. An output of delay circuit 85 forms a first of four data outputs for machines 1 thru 4. An output of inverter 83 is coupled to a recoding portion 86. A second data input terminal 87 receives an addend input and is coupled to an input of a half latch circuit 88. An output of a half latch circuit 88 is connected to a first sum input terminal of a full adder 89 labeled "A". A sum output labeled "S" of full adder 89 provides a second data output of the illustrated machine. A reset terminal which receives a reset signal is connected to both an input of a delay circuit 90 and to complementary inputs of half latch 88. An output of delay circuit 90 provides a delayed reset signal (Reset') to be used by the machine and is coupled to an input of a delay circuit 91. An output of delay circuit 91 provides a further delayed reset signal to be used by a sequential machine. A third data input terminal 92 receives a second addend input and is connected to an input of a half latch circuit 93. Complementary control inputs of the half latch circuit 93 are connected to the reset signal. An output of half latch circuit 93 is connected to a first sum bit input terminal labeled "A" of a full adder circuit 94. A sum output labeled "S" of full adder 94 provides a third data output of the illustrated machine. A fourth data input terminal 95 sequentially receives bits C0, C2, C4, C6 and the complement of C7. An input of an inverter 96 and an input of a delay circuit 97 are connected to input terminal 95. An output of delay circuit 97 is connected to an input of a delay circuit 98. An output of delay circuit 98 provides a fourth data output of the illustrated machine. A recoding portion 99 is connected to the output of inverter 83. Recoding portion 86 comprises transistors 100, 101, 102, 103 and 104. Transistor 100 has a first current electrode connected to input terminal 82 and a second current electrode connected to a second data input terminal of full adder 89 labeled "B". Transistor 101 has a first current electrode connected to the output of inverter 83, and a second current electrode connected to the second data input terminal of full adder 89. Transistor 102 has a first current electrode connected to a reference ground terminal, and has a second current electrode connected to the second data input terminal of full adder 89. Transistor 103 has a first current electrode connected to input terminal 95, and has a second current electrode connected to the second data input terminal of full adder 89. Transistors 100-104 respectively have a control electrode connected to a control signal for implementing a recoding factor of plus one, negative one, zero, plus two and negative two, respectively. A delay circuit 105 has an input connected to input terminal 82, and has an output and a complementary output. Delay circuit 105 also has a reset terminal for receiving the reset signal from the output of delay circuit 90. Recoder portion 99 comprises transistors 106, 107, 108, 109 and 110. Transistor 106 has a first current electrode connected to input terminal 95, and has a second current electrode connected to a second data input terminal of full adder 94 labeled "B". Transistor 107 has a first current electrode connected to the output of inverter 96, and has a second current electrode connected to the second data input terminal of full adder 94. Transistor 108 has a first current electrode connected to a reference ground terminal, and has a second current electrode connected to the second data input terminal of full adder 94. Transistor 109 has a first current electrode connected to an output of delay circuit 105, and has a second current electrode connected to the second data input terminal of full adder 94. Transistor 110 has a first current electrode connected to the complementary output of delay circuit 105, and has a second current electrode connected to the second data input terminal of full adder 94. Transistors 106-110 respectively have a control electrode connected to a control signal for implementing a recoding factor of plus one, negative one, zero, plus two or negative two, respectively. A carry output terminal of full adder 89 is connected to an input of a delay circuit 113. An output of delay circuit 113 is connected to a carry input terminal of full adder 94. Delay circuit 113 has a reset terminal for receiving the reset signal from the output of delay circuit 113, and has a subtraction control signal input terminal labeled "S" for selectively coupling a carry input bit to adder 94 to implement two's complement addition.

In operation, the machine illustrated in FIG. 10 functions in a similar manner to the machine discussed at length in FIG. 6. One difference between the machine of FIG. 10 and the machine of FIG. 6 is the order of C operand bits which are coupled to the input terminals. Also, in FIG. 10 the bits which are coupled to the "A" inputs of full adders 89 and 94 are forced to a logic zero and the recoding determines the bit values which are coupled to the "A" inputs of the pair of adder circuits during the last time period for machine one.

As a general rule, the number of machines, R, required to perform the multiplication of operands X and Y having x and y bits, respectively, when Modified Booth's algorithm is used with the Baugh-Wooley technique is given by the following expression:

$$R = INT[(y+1)/2] \tag{1}$$

where "INT" represents a truncation of any fractional value to a lower integer value. The number of time periods, Q, required to perform a multiplication of the X and Y operands in each row when Modified Booth's algorithm is used with the Baugh-Wooley technique is:

$$Q = INT[(x+3)/2] \tag{2}$$

where "INT" also represents a truncation of any fractional value to a lower integer value. The number of time periods required to perform a multiplication using Modified Booth's algorithm with the Baugh-Wooley technique is $[2(R-1)+Q]$. The number of time period required to perform a multiplication and accumulation is $[2R+Q+A]$, where "A" is the number of additional bits to be accumulated. Also, an integer number of machines equal to "R+1" is required to perform a multiplication and accumulation since an additional machine is usually required to perform the accumulation.

By now it should be apparent that a pipelined, digital multiplier has been provided which efficiently implements a multiplication or multiplication/accumulation. The present invention may be used in conjunction with a recoding algorithm such a Modified Booth's algorithm and may be used with any type of pipelineable array multiplier. The present invention may also be utilized in the array multiplier of the copending U.S. patent application Ser. No. 06/919,520 entitled "Method for Minimizing Sign Extension Logic In an Array Multiplier" and assigned to the assignee hereof. This cited reference teaches a way to minimize sign extension logic in a conventional Baugh-Wooley type of array multiplier. The multiplier taught herein minimizes circuitry and maximizes data throughput and speed. The latency of the multiplier taught herein is minimized by using existing data propagation characteristics to the maximum advantage rather than trying to change the propagation delays. As a result, a very powerful multiplier for large bit sized operands is provided. It should be apparent that if an adder having a sum propagation delay which is several times faster than the carry propagation delay is used, the present invention may be implemented by expanding the number of sum generation adder cells to the right of each adder cell shown in FIG. 4A. In such an example, a number of product calculations may be implemented simultaneously in a pipelined manner. The present invention may also be utilized in connection with other speed improvement techniques such as a sum skipping technique as illustrated in U.S. Pat. No. 4,575,812 entitled "An X×Y Bit Array Multiplier/Accumulator Circuit", assigned to the assignee hereof. The sum skipping technique improves speed in an array multiplier by skipping one or more rows of adders of the array when coupling predetermined sum bits of the array to an adder circuit of a nonadjacent row in the array.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. A pipelineable array multiplier for multiplying first and second input operands and providing an output product, said array multiplier utilizing a predetermined recoding algorithm to implement a multiplication operation with X rows and Y columns of partial product bits which when summed provide the output product, where X and Y are integers, comprising:

X columns of summing means for adding the partial product bits of the array to form the output product, each of the X columns of summing means adding the partial product bits of a predetermined one of the X rows in a time overlapping operation between successive columns and during successive time periods, and each column of summing means except a first selectively coupled to a previous column for receiving partial product input bits from the previous column, each column of summing means comprising a predetermined number of pairs of adder circuits, each pair being series-connected and said predetermined number of pairs of adder circuits in each column being determined by a ratio of carry bit input to output and sum bit input and output propagation delays of the adder circuits when forming output sum and carry bits; and control means coupled to the X columns of summing means for controlling the time overlapping successive additions of each of the X columns of summing means.

2. The pipelineable array multiplier of claim 1 further comprising:

accumulation means coupled to the control means and the X columns of summing means for receiving a third input operand and adding the third input operand with the output product to provide an accumulated product resultant.

3. The pipelineable array multiplier of claim 1 wherein the carry bit propagation delay of each of the adder circuits is substantially twice as fast as the sum bit propagation delay of each of the adder circuits.

4. The pipelineable array multiplier of claim 1 wherein the predetermined recoding algorithm is Modified Booth's algorithm.

5. In an array multiplier for multiplying first and second input operands and providing an output product, the array multiplier utilizing a predetermined recoding algorithm to implement a multiplication operation with X rows and Y columns of partial product bits which when summed provide the output product, where X and Y are integers, a method of improving the multiplier's speed, comprising the steps of:

providing X columns of summing means for adding the partial product bits of the array, each of the X columns of summing means adding a predetermined one of the X rows of partial product bits, said addition occurring successively between the X columns in a time overlapping operation between successive columns during successive time periods;

implementing each of the X summing means with a predetermined number of pairs of adder circuits, said predetermined number of pairs of adder circuits in each column being determined by a value of a ratio of carry bit input to output and sum bit input to output propagation delays of the adder circuits; and controlling the time overlapping successive additions of the X columns of summing means to provide the output product.

6. The method of claim 5 further comprising the step of:

receiving a third input operand and adding the third input operand with the output product to provide an accumulated product resultant.

* * * * *